United States Patent
Dugger et al.

[11] Patent Number: 5,830,046
[45] Date of Patent: Nov. 3, 1998

[54] BELT SHIFTING IDLER PULLEY FOR RECIPROCATING AN ABRASIVE BELT

[75] Inventors: Ben Allen Dugger, Pell City; Antoine Ibrahim Hallit, Alabaster, both of Ala.

[73] Assignee: Vulcan Engineering Co., Helena, Ala.

[21] Appl. No.: 741,018

[22] Filed: Oct. 28, 1996

[51] Int. Cl.$^6$ ................................................. B24B 21/20
[52] U.S. Cl. .................... 451/297; 451/304; 451/311; 451/513; 474/122; 474/133
[58] Field of Search ..................... 451/296, 297, 451/304, 310, 311, 513, 516; 474/110, 117, 135, 122, 123, 127, 128, 133

[56] References Cited

U.S. PATENT DOCUMENTS

| | | |
|---|---|---|
| 2,191,155 | 2/1940 | Mattison . |
| 2,463,287 | 3/1949 | Krueger ............................. 451/311 X |
| 2,637,952 | 5/1953 | Reed ................................... 451/311 X |
| 2,663,978 | 12/1953 | Lindmark ............................... 451/311 |
| 2,714,787 | 8/1955 | Orr ......................................... 451/304 |
| 2,752,734 | 7/1956 | McGibbon ......................... 451/304 X |
| 3,491,488 | 1/1970 | Schaller et al. . |
| 3,577,684 | 5/1971 | Jakimcius . |
| 3,922,820 | 12/1975 | Wiltshire ............................... 451/304 |
| 4,023,426 | 5/1977 | Duryea, Jr. . |
| 4,267,671 | 5/1981 | Rettew . |
| 4,299,583 | 11/1981 | Kraft et al. ............................. 474/110 |
| 4,578,906 | 4/1986 | Appleton . |
| 4,603,510 | 8/1986 | Rasmussen . |
| 4,640,056 | 2/1987 | Stump . |
| 4,669,224 | 6/1987 | Armstrong et al. ................. 451/311 X |
| 4,742,649 | 5/1988 | Fuchs . |
| 5,117,969 | 6/1992 | Roth ......................................... 198/807 |
| 5,185,963 | 2/1993 | De brey . |

Primary Examiner—Timothy V. Eley
Attorney, Agent, or Firm—Veal & Associates

[57] ABSTRACT

An apparatus for continually shifting an endless abrasive belt trained between a drive pulley and an idler wheel. The belt is trained around an idler wheel which is supported by an arm above a continually pivoting platform transverse to the travel direction of travel of the endless belt. The platform is pivotally supported by a fulcrum mechanism at a pivot axis bisecting the platform, and a resilient member urges one side of the platform down while an inflatable and deflatable bladder continually urges the other side of the platform up and down. A tensioning means biases the arm supporting the idler wheel away from the drive pulley to maintain tension on the endless belt between the idler wheel and the drive wheel while the idler wheel is reciprocating. The bladder is continually inflated and deflated per a preselected time period to selectively vary the shifting cycle. Due to the exposure of the full surface area of the abrading belt to a work piece placed against the drive wheel, the useful life of the abrading belt is increased as well as increasing the effective friction upon the work piece.

24 Claims, 2 Drawing Sheets

BELT SHIFTING IDLER PULLEY FOR RECIPROCATING AN ABRASIVE BELT

FIELD OF THE INVENTION

The present invention relates generally to belt type abrading machines such as an endless belt sander or grinder. In particular, the present invention relates to idler pulleys that maintain tension on an endless belt trained between the idler pulley and a drive pulley. In even greater particularity, the invention relates to apparatuses that periodically move the idler pulley so that the endless belt periodically shifts on the drive pulley to distribute wear over the entire surface of the belt.

BACKGROUND OF THE INVENTION

Long ago it was realized that by shifting the endless abrading belt relative to the workpiece in an abrading or sanding machine, the longevity of the belt could be increased. In a typical belt sander or grinder an endless abrasive belt is trained under tension between an idler pulley and a drive pulley. Some sanders have been manufactured that move one or both of the pulleys in a lateral direction relative to the other pulley so that the endless belt shifts position on one or the other pulley so that wear on the belt is evenly distributed over the entire surface area. Other belt sanders exist that periodically adjust the position and tension of the belt in response to sensors placed in proximity to the pulleys.

Numerous arrangements are known to accomplish the shifting of the belt. For example, Jakimcius, U.S. Pat. No. 3,577,684, discloses an endless belt abrading machine with a combined steering and tensioning roll which is mounted for up and down tilting movement and which is tilted alternately by oppositely inclined positions by a steering actuator so as to induce edgewise travel of the belt across the roll.

Rettew, U.S. Pat. No. 4,267,671, discloses an oscillating idler pulley-drive pulley column relative to a work piece holder table. The table also reciprocates relative to the column, and the speed and distance of movement of the table and column are variable.

Rasmussen, U.S. Pat. No. 4,603,510, discloses a three pulley arrangement belt grinder which has a plurality of work stations for grinding. A drive motor is mounted centrally within the machine head assembly which drives a large primary wheel. Tension on the abrasive belt and a V-belt is applied or released in incremental order with the revolution of a leveraged step cam. The arrangement includes hardware to evaluate machine dust, adjust V-belt and abrasive belt tension and adjust belt tracking camber.

Fuchs, U.S. Pat. No. 4,742,649, discloses a belt tracking adjustment mechanism for a belt type abrading machine. However, Fuchs' apparatus addresses a strategy for manual adjustment of the tracking of the belt over the pulleys.

While these references disclose some of the many available abrading machine arrangements, these arrangements are relatively complex and expensive. Moreover, none of the references disclose a simple, low-complexity combined tension and steering arrangement for continually shifting the abrading belt on the drive pulley with reciprocal idler pulley movement.

SUMMARY OF THE INVENTION

It is the object of the present invention to provide a low complexity idler pulley mounted on a tilting platform for shifting a belt trained around a drive pulley and the idler pulley.

Another object is to provide a combined steering and tensioning apparatus for an idler wheel for continually laterally shifting an endless belt trained between a drive pulley and the idler pulley.

In summary, the invention provides an apparatus for continually shifting an endless abrasive belt trained between a drive pulley and an idler wheel. The idler wheel is supported by an arm above a platform which reciprocally pivots transversely to the direction of travel of the endless belt. The platform is pivotally supported by a fulcrum mechanism at a pivot axis. A resilient member urges one side of the platform up while an air bladder below the other side of the platform continuously inflates and deflates, so that it alternately urges the other side of the platform upwardly or allows it to be urged downwardly by the resilient member. Alternatively, a second air bladder could replace the resilient member in a cooperative arrangement with the first bladder. A tensioning means biases the arm supporting the idler wheel away from the drive wheel to maintain tension on the endless belt between the idler wheel and the drive wheel. The bladder is continually filled with air and evacuated per a preselected time cycle to effect the reciprocal motion of the idler wheel.

Other features and objects and advantages of the present invention will become apparent from a reading of the following description as well as a study of the appended drawings.

BRIEF DESCRIPTION OF THE DRAWINGS

A idler pulley incorporating the features of the invention is depicted in the attached drawings which form a portion of the disclosure and wherein.

DESCRIPTION OF THE PREFERRED EMBODIMENTS

Figure 1:
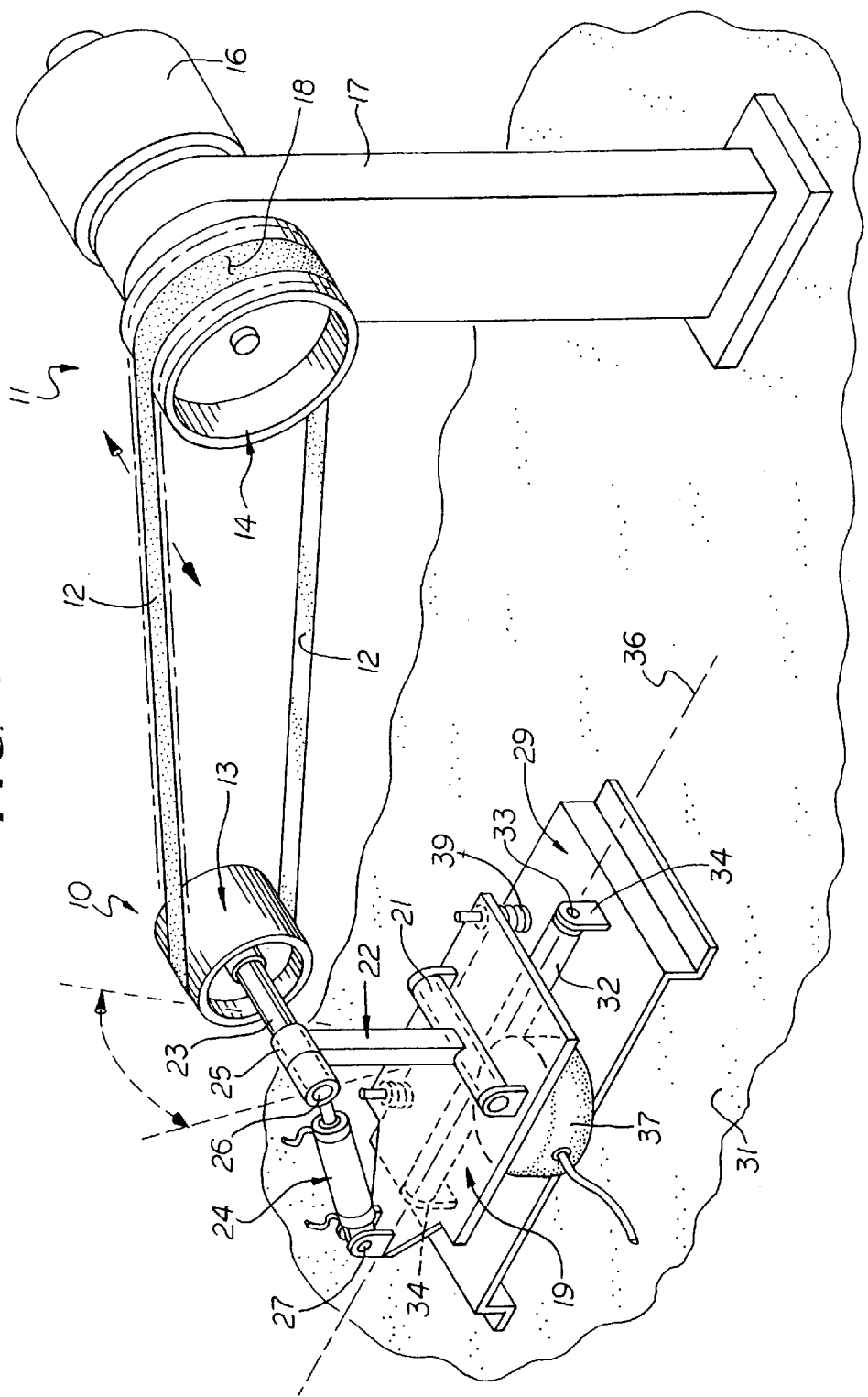
FIG. 1 is a perspective view of the idler pulley.

Referring to the drawings for a better understanding of the function and structure of the invention, FIG. 1 shows the operational environment of the idler pulley 10. Drive pulley 11 is in operational communication with idler pulley 10 through an endless abrading belt 12 trained between the two pulleys. The abrading belt 12 rides on an idler wheel 13 which laterally shifts positions relative to the drive pulley 11 causing the belt 12 to shift positions on the drive wheel 14. The drive wheel is driven by a conventional electric motor 16, and a column 17 supports both the drive wheel and the motor in fixed relation to the idler pulley 10. As the belt 12 shifts positions on the drive wheel 14, any work piece held against the abrading belt in the optimal abrading contact area 18 will be abraded by most of the surface of the belt 12 within a short period of contact time. Due to the exposure of the full surface area of the abrading belt to the work piece, the useful life of the abrading belt is increased as well as increasing the effective friction.

Figure 2:
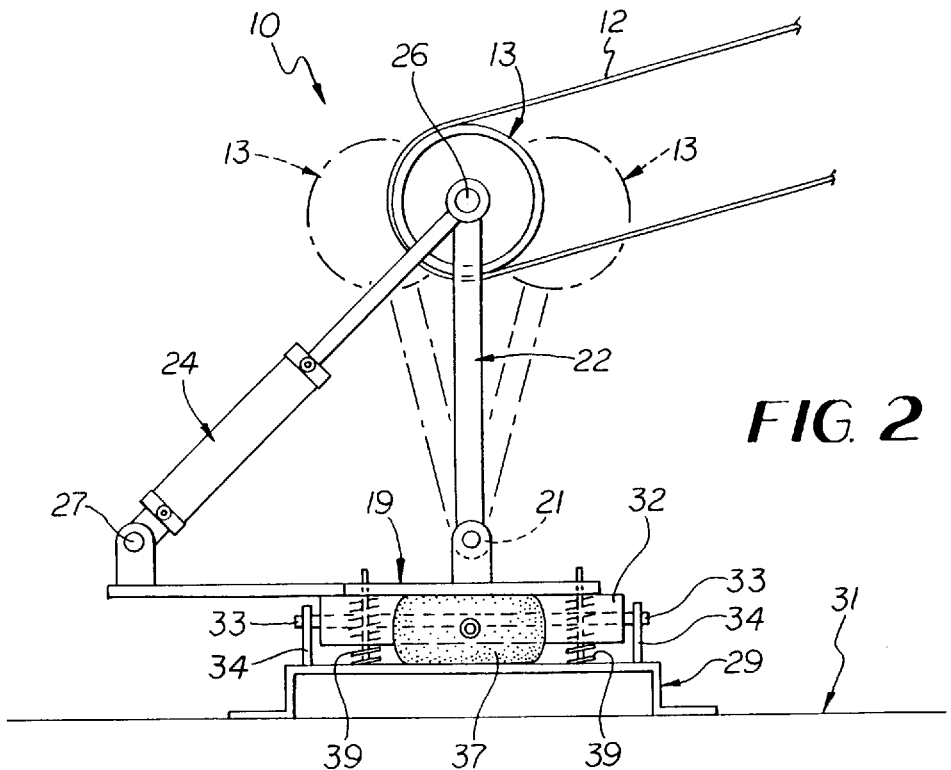
FIG. 2 is a side elevational view of the idler pulley.
Figure 3:
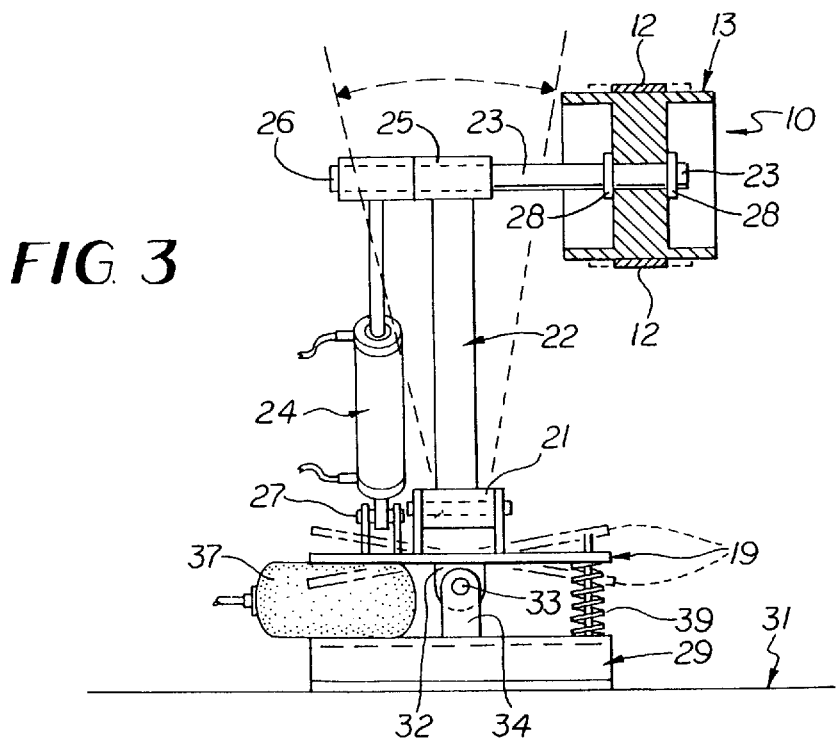
FIG. 3 is a front elevational view of the idler pulley with the idler wheel in section.

Referring again to FIG. 1, idler wheel 13 is supported above an upper platform 19 with support arm 22. The lower end of the support arm 22 is connected to the upper platform 19 via journal bearing 21, which allows for pivotal motion of the support arm and idler wheel toward and away from the drive pulley 11. A rod 23 is orthogonally fixed to support arm 22 within a transversely oriented sleeve 25 formed on the upper end of the support arm. As more clearly shown in FIGS. 2 and 3, wheel 13 is rotatably supported by antifriction bearings on the end of rod 23 distal the sleeve 25 as indicated at 28. The rod is dimensioned to have the non-idler wheel end 26 extend through the sleeve 25. A linear actuator 24 has an upper end rotatably coupled to end 26, and a lower end pivotally attached to upper platform 19 at 27. The purpose of the actuator is to bias the upper end of the support arm (and thereby the idler wheel) away from the drive wheel 14 so that tension is continually maintained on the belt. While the lower end of the actuator 24 is shown attached to the upper platform 19, it should be understood that the lower end can be attached to any fixed support, relative to the drive pulley 11. For example, attaching the lower end of the actuator 24 to the lower platform 29, or a flat work surface 31 upon which the idler pulley 10 may be affixed would be suitable connection points.

To create lateral motion of the idler wheel 13, upper platform 19 is pivotally supported by a journal bearing 32 which has ends 33 rotatably attached to lower platform 29 via brackets 34. The upper platform 19 is pivotally supported by the bearing 32 at a selected point of pivot axis 36. The bearing is attached to the lower surface of the upper platform 19 to prevent movement of the pivot axis relative to the upper platform 19. The bearing is attached to the underside of the platform 19 by a weldment or brackets as is well known in the art. Pivotal motion is induced by an inflatable bladder 37 which is positioned between the lower platform 29 and the upper platform 19 to one side of the pivot axis 36. As the bladder is inflated, one side of the upper platform 19 is urged away from the lower platform 29, and concurrently the side of platform 19 opposite from the bladder side is urged toward the lower platform 29 due to the pivotal bearing attachment (See FIG. 3). Resilient biasing members 39 are positioned on the other side of pivot axis 36 between the upper and lower platforms opposite from the bladder position, and are compressed upon inflation of the bladder. Upon deflation of the bladder 37, the biasing members 39 urge their side of the platform 19 away from lower platform 29, thereby lowering the bladder side of the upper platform, to complete a full tilting cycle of platform 19. The biasing members also aid in deflation of the bladder by exerting compression force upon the bladder during the deflation stage of a tilting cycle. Alternatively, a second air bladder could be substituted for the biasing members 39 which would work in cooperative arrangement with the primary air bladder 37 to reciprocally urge the appropriate side of the platform 19. As the platform 19 tilts through a cycle, the support arm 22 and the attached idler wheel 13 also tilt relative to the lower platform 29 to create a reciprocal tilting motion of the belt riding on the idler wheel 13, which in turn causes a reciprocal shifting motion of the belt riding on the drive wheel 14. As is apparent from the figures, the parallel segments of the belt 12 trained between the drive wheel 14 and the idler wheel 13 define a vertical plane of travel between the two. To optimize the reciprocal tilting motion of the belt riding upon the idler wheel, pivot axis 36 should be kept in substantially parallel alignment with the aforementioned vertical plane. Continual tension is maintained on belt 12 with actuator 24 through the duration of a tilting cycle, as previously described.

FIG. 1 depicts the invention as including a lower platform 29 which also serves as a stand bolted onto a flat surface 31. However, it is not critical that the invention include a separate lower platform 29. As long as a supporting surface exists beneath the upper platform 19 so that the bladder can expand to urge one side of the upper platform up, a separate lower platform can be discarded. However, omission of the lower platform would require that bracket members 34 which support the journal bearing 32 be affixed directly to the supporting surface. Also, biasing members 39 would need to have one end affixed to the supporting surface in lieu of platform 29.

The mechanism for inflation of the bladder is most easily accomplished with a variable pressure timing valve connected with tubing to the bladder via a compressed air supply as is well known in the art. Alternatively, a pressure valve integral with the bladder may open for a preselected duration of time upon reaching a preselected pressure within the bladder. Furthermore, timing of the expansion and contraction of the bladder can be varied to control the period of tilting cycle for optimal wearing of various types of abrading belts. Although symmetric periods of shifting of the idler wheel would be typical, the apparatus contemplates irregular or non-periodic tilting cycles which may further improve belt-life. Non-periodic shifting can be accomplished with more sophisticated bladder expansion control systems.

While I have shown my invention in one form, it will be obvious to those skilled in the art that it is not so limited but is susceptible of various changes and modifications without departing from the spirit thereof.

Having set forth the nature of the present invention, what is claimed is:

1. An idler pulley for reciprocating an endless abrasive belt trained between a drive pulley and said idler pulley, comprising:
   a. an idler wheel having an axis of rotation transverse to said belt;
   b. a platform for supporting said idler wheel, said platform having a pivot axis perpendicular to said axis of rotation;
   c. support means for connecting said idler wheel to said platform;
   d. means for pivotally supporting said platform about said pivot axis;
   e. tension actuator means connected to said support means for urging said idler wheel away from said drive pulley and into pressing engagement with said belt; and
   f. steering actuator means for urging said platform to pivot about said pivot axis causing reciprocal lateral movement of said idler wheel so that said belt shifts position on said drive pulley.

2. An idler pulley as recited in claim 1, wherein said fulcrum means comprises:
   a. a stand; and
   b. a journal bearing mounted on said stand, and wherein said platform means rests on and is connected to said journal bearing along said pivot axis for pivotal motion about said pivot axis.

3. An idler pulley as recited in claim 1, wherein said support means comprises a support arm having a first end pivotally mounted to said platform and a second end rotatably supporting said idler wheel above said platform.

4. An idler pulley for reciprocating an endless abrasive belt trained between a drive pulley and said idler pulley, comprising:
   a. an idler wheel;
   b. a platform for supporting said idler wheel, said platform having a pivot axis and a first side;
   c. support means for connecting said idler wheel to said platform;
   d. means for pivotally supporting said platform about said pivot axis;

e. tension actuator means connected to said support means for urging said idler wheel away from said drive pulley and into pressing engagement with said belt; and f. steering actuator means for urging said platform to pivot about said pivot axis causing reciprocal movement of said idler wheel so that said belt shifts position on said drive pulley, said steering actuator means comprising first biasing means intermediate said stand and said platform positioned laterally of said pivot axis for urging said first side of said platform away from said stand, and second biasing means positioned opposite said first biasing means in relation to said pivot axis for biasing said first side of said platform toward said stand.

5. An idler pulley as recited in claim 4, wherein said first biasing means comprises an expandable and deflatable air bladder.

6. An idler pulley as recited in claim 5, wherein said support means comprises a support arm having a first end pivotally mounted to said platform and a second end rotatably supporting said idler wheel above said platform.

7. An idler pulley as recited in claim 6, wherein said first end is oriented on said platform such that said arm pivots in a transverse direction relative to said pivot axis.

8. An idler pulley as recited in claim 7, wherein said tension actuator means comprises a linear actuator having one end connected to said platform and an other end connected to said support means proximal said idler wheel.

9. An idler pulley as recited in claim 8, wherein said steering actuator means urges said platform to pivot about said pivot axis in a substantially continuous manner pursuant to a preselected periodic time cycle.

10. An idler pulley for reciprocating an endless abrasive belt trained between a drive pulley and said idler pulley, comprising:

a. an idler wheel;

b. a platform for supporting said idler wheel, said platform having a pivot axis;

c. support means for connecting said idler wheel to said platform;

d. means for pivotally supporting said platform about said pivot axis, comprising:
   i. a stand;
   ii. a pivot bar mounted on said stand along said pivot axis, and wherein said platform means rests on said pivot bar for pivotal motion about said pivot axis in response to actuation of said steering actuator means; and
   iii. means for biasing said platform against said pivot bar so that said pivot axis remains fixed relative to said pivotal supporting means;

e. tension actuator means connected to said support means for urging said idler wheel away from said drive pulley and into pressing engagement with said belt; and f. steering actuator means for urging said platform to pivot about said pivot axis causing reciprocal movement of said idler wheel so that said belt shifts position on said drive pulley.

11. An idler pulley as recited in claim 10, wherein said platform has a first side and wherein said steering actuator means comprises:

a. first biasing means intermediate said fulcrum means and said platform positioned laterally of said pivot axis for urging said first side of said platform away from said stand; and b. second biasing means positioned opposite said first biasing means in relation to said pivot axis for biasing said first side of said platform toward said stand.

12. An idler pulley as recited in claim 11, wherein said first biasing means comprises an expandable and deflatable air bladder.

13. An idler pulley as recited in claim 12, wherein said second biasing means comprises a resilient member.

14. An idler pulley for reciprocating an endless abrasive belt trained between a drive pulley and said idler pulley comprising:

a. an idler wheel;

b. a platform for supporting said idler wheel, said platform having a pivot axis;

c. support means for connecting said idler wheel to said platform, said support means comprising a support arm having a first end pivotally mounted to said platform, said first end oriented on said platform such that said arm pivots in a transverse direction relative to said pivot axis, and a second end rotatably supporting said idler wheel above said platform;

d. means for pivotally supporting said platform about said pivot axis;

e. tension actuator means connected to said support means for urging said idler wheel away from said drive pulley and into pressing engagement with said belt; and f. steering actuator means for urging said platform to pivot about said pivot axis causing reciprocal movement of said idler wheel so that said belt shifts position on said drive pulley.

15. An idler pulley as recited in claim 14, wherein said first end comprises a journal bearing rigidly fixed to said support arm and wherein said second end includes a journaled rod extending orthogonally from said arm for rotatably supporting said idler wheel.

16. An idler pulley for reciprocating an endless abrasive belt trained between a drive pulley and said idler pulley, comprising:

a. an idler wheel;

b. a first platform, said first platform including a pivot bar mounted thereon to pivotally support said second platform along said pivot axis, and wherein said first platform includes means for biasing said second platform against said pivot bar at said pivot axis;

c. a second platform pivotally mounted above said first platform in substantially parallel relationship to said first platform, said second platform movable about a pivot axis;

d. support means connected to said second platform for rotatably supporting said idler wheel above said second platform;

e. tension means for urging said idler wheel away from said drive pulley and into pressing engagement with said belt; and f. steering means for urging said second platform to pivot about said pivot axis causing reciprocal movement of said idler wheel so that said belt shifts position on said drive pulley.

17. An idler pulley for reciprocating an endless abrasive belt trained between a drive pulley and said idler pulley, comprising:

a. an idler wheel;

b. a first platform;

c. a second platform pivotally mounted above said first platform in substantially parallel relationship to said first platform, said second platform movable about a pivot axis;

d. support means connected to said second platform for rotatably supporting said idler wheel above said second platform;

e. tension means for urging said idler wheel away from said drive pulley and into pressing engagement with said belt; and f. steering means for urging said second platform to pivot about said pivot axis causing reciprocal movement of said idler wheel so that said belt shifts position laterally on said drive pulley.

18. An idler pulley as recited in claim 17, wherein said second platform has a first side and wherein said steering means comprises:

a. first biasing means intermediate said first platform and said second platform positioned laterally of said pivot axis for urging said first side of said second platform away from said first platform; and b. second biasing means positioned opposite said first biasing means in relation to said pivot axis for biasing said first side of said second platform toward said first platform.

19. An idler pulley as recited in claim 18, wherein said first biasing means comprises an expandable and deflatable air bladder.

20. An idler pulley as recited in claim 19, wherein said second biasing means comprises a resilient member.

21. An idler pulley as recited in claim 17, wherein said support means comprises a support arm having a first end pivotally mounted to said second platform and a second end rotatably supporting said idler wheel above said platform.

22. An idler pulley for reciprocating an endless abrasive belt trained between a drive pulley and said idler pulley, comprising:

a. an idler wheel;

b. a first platform;

c. a second platform pivotally mounted above said first platform in substantially parallel relationship to said first platform, said second platform movable about a pivot axis;

d. support means connected to said second platform for rotatably supporting said idler wheel above said second platform, said support means comprising a support arm having a first end pivotally mounted to said second platform and a second end rotatably supporting said idler wheel above said platform, wherein said first end is oriented on said platform such that said arm pivots in a transverse direction relative to said pivot axis;

e. tension means for urging said idler wheel away from said drive pulley and into pressing engagement with said belt; and f. steering means for urging said second platform to pivot about said pivot axis causing reciprocal movement of said idler wheel so that said belt shifts position on said drive pulley.

23. An idler pulley as recited in claim 22, wherein said first end comprises a journal bearing rigidly fixed to said support arm and wherein said second end includes a journaled rod extending orthogonally from said arm for rotatably supporting said idler wheel.

24. An idler pulley for reciprocating an endless abrasive belt trained between a drive pulley and said idler pulley, comprising:

a. an idler wheel;

b. a first platform;

c. a second platform pivotally mounted above said first platform in substantially parallel relationship to said first platform, said second platform movable about a pivot axis;

d. support means connected to said second platform for rotatably supporting said idler wheel above said second platform;

e. tension means for urging said idler wheel away from said drive pulley and into pressing engagement with said belt, said tension means comprising a linear actuator having one end connected to said second platform and an other end having means for connecting to said idler wheel; and f. steering means for urging said second platform to pivot about said pivot axis causing reciprocal movement of said idler wheel so that said belt shifts position on said drive pulley.

* * * * *